United States Patent

Iijima et al.

[11] Patent Number: 5,144,492
[45] Date of Patent: Sep. 1, 1992

[54] LENS CONTROL SYSTEM

[75] Inventors: Ryunosuke Iijima, Ebina; Kitahiro Kaneda, Yokohama, both of Japan

[73] Assignee: Canon Kabushiki Kaisha, Tokyo, Japan

[21] Appl. No.: 667,191

[22] Filed: Mar. 8, 1991

[30] Foreign Application Priority Data

Mar. 12, 1990 [JP] Japan .................................. 2-62300
Sep. 17, 1990 [JP] Japan ................................. 2-248185
Sep. 17, 1990 [JP] Japan ................................. 2-248187

[51] Int. Cl.$^5$ ............................................. G02B 15/00
[52] U.S. Cl. .................................... 359/698; 359/693; 359/705; 354/400; 354/195.12
[58] Field of Search ............... 359/693, 694, 695, 696, 359/697, 698, 676, 705; 354/400, 195.12, 195.10

[56] References Cited

U.S. PATENT DOCUMENTS

| | | | |
|---|---|---|---|
| 4,609,260 | 9/1986 | Kawai | 359/698 |
| 4,899,190 | 2/1990 | Hata | 359/705 |
| 4,975,724 | 12/1990 | Hirasawa et al. | 354/400 |
| 4,976,523 | 12/1990 | Ishikawa | 359/696 |
| 4,991,944 | 2/1991 | Hirao et al. | 359/698 |
| 5,038,163 | 8/1991 | Hirasawa | 354/400 |

Primary Examiner—Loha Ben
Attorney, Agent, or Firm—Robin, Blecker, Daley & Driscoll

[57] ABSTRACT

A lens control system is disclosed, which comprises a focusing lens drive for driving a focusing lens for focus control, a zooming lens drive for driving a zooming lens for zooming, a focusing lens position detector for detecting the position of the focusing lens, a zooming lens position detector for detecting the position of the zooming lens, and a control circuit for controlling, when the zooming lens position detector detects that the zooming lens is in a macro region, the focusing lens drive to stop the focusing lens at a predetermined position.

11 Claims, 9 Drawing Sheets

LENS CONTROL SYSTEM

BACKGROUND OF THE INVENTION

1. Field of the Invention

This invention relates to lens control systems suitably used for video cameras and electronic still cameras and, more particularly, to lens control in wide-macro region.

2. Related Background Art

Recently, video apparatuses such as video cameras and electronic cameras have been developed remarkably, and particularly various functions are provided as standard functions such as autofocus (AF), autostop (AS), automatic white balance control, zooming and macro-photography to improve the performance and operability.

Concerning the autofocus, it is now becoming a main system to detect the sharpness of object image from video signal obtained through photoelectric conversion of optical signal from an image sensor element or the like and effect focus control through focusing lens position control such as to provide for a maximum sharpness of the image.

The sharpness is usually evaluated in terms of the high frequency component level of a video signal extracted by a band-pass filter (BPF) or the detection level of blur width (i.e., width of an edge portion of object image) of a video signal extracted by a differentiating circuit or the like.

When a usual object is photographed in an out-of-focus state, the high frequency component level is high, while the blur width is large. When perfect focus is obtained, the high frequency component level and blur width respectively have maximum and minimum values. When the sharpness is low, the focusing lens is driven at as high speed as possible in a direction to increase the sharpness, and as the sharpness is increased it is slowed down to be stopped accurately at a peak of sharpness. This focusing system is commonly termed the mountain-climbing autofocusing (AF) system.

With the adaptation of this autofocus function, the operability of particularly video cameras or the like for taking motion pictures is revolutionally improved, and the function is currently a prerequisite.

With operability improvement attained with adaptation of the AF system and also for a purpose of increasing the scope and functions of photography to be able to meet many more photographic conditions, zoom lenses are adopted as standard elements to permit tele-macro photography, i.e., photography in tele-macro region. They permit focusing of closer objects with extension of the movable range of a conventional front focusing lens to the macro side. For example, there are many proposed cameras with zoom lenses having a function of macro-photography. In a well-known example of such camera, a first group lens (i.e., front lens) effects focusing, and second and third group lenses effect zooming.

In this case, when an object gets closer and to be in a macro distance beyond a distance control range, in which focusing can be effected by the first group focusing lens, the focusing lens can no longer effect focusing, and in such a circumstance the second and third group lenses which effect zooming are moved relatively to effect the shortest range photography (macro-photography).

For macro-photography, lenses are moved from the tele- or wide-end of the zoom lens.

With prior art cameras, however, the focusing lens remains under auto-focus control even when it is detected that the zoom lens is in wide-macro region, or the position of the focusing lens at the instant of reaching of the wide-macro region by the zoom lens is held even when the focusing lens is stopped. This means that the object distance range in the wide-macro region is from the immediate lens front to the focusing lens position, and depending on the focusing lens position the range of focusing by movement of a compensator lens is affected. Therefore, in many cases it is optically impossible to effect focusing from infinity up to the immediate lens front.

Further, continuous lens operation may cause image magnification changes and also increases power consumption.

In a further aspect, in the wide-macro region the focusing is effected by operating the zoom lens. This control is different from focusing in the normal region, and usually focusing in the wide-macro region is done manually. This is a sacrifice in view of the operability improvement.

In the meantime, there is commonly termed power wide-macro focusing which is proposed for such case as when direct manual zoom lens operation is impossible. In this case, wide-macro focusing is effected by driving the zoom lens with a switch input operation.

However, autofocusing is desired from the standpoint of operability. In view of autofocusing in the wide-macro region, it may be considered to perform mountain climbing AF control of the zoom lens according to focus detection information in the wide-macro region. However, since the focusing is done by different control systems in the wide-macro region and in the normal region, the mountain climbing AF control will deteriorate the response of AF operation when normal AF operation is restored after the end of the wide-macro AF operation in the wide-macro region.

Further, when the focusing lens driving motor is operated during wide-macro AF operation, such serious problems as generation of drive noise, increase of power consumption and increase of other noise are presented, although the focusing itself may not be affected.

Further, in an operability aspect, automation of various operations is demanded very strongly in a system having both tele- and wide-macro AF functions. In a system, in which the focusing is done automatically in the normal region but is done manually in the macro region, the operability is unsatisfactory, and it is impossible to make use of the features of AF function in the normal region.

For permitting autofocusing in the wide-macro region, it may be considered to let the zoom lens be controlled by mountain climbing AF control according to focus detection information. However, since focusing is done by different control systems in the wide-macro and normal regions, in such case as when front focusing lens is in a tele-macro region of 0.6 to 1.2 m at an instant of start of wide-macro AF operation in the wide-macro region a phenomenon of failure of focusing of a distant object is liable due to optical limitations. This is a very serious problem in view of overall automation of focusing of the system.

SUMMARY OF THE INVENTION

The present invention has been intended in order to solve the problems discussed above, a first object of the invention being to provide a lens control system, which permits focusing in the macro region over the entire distance range from infinity to the macro end and permits this focusing as satisfactory macro region autofocusing free from magnification changes due to the focusing lens.

A second object of the invention is to provide a lens control system, which consumes low power and generates low noise.

A third object of the invention is to provide a lens control system, which permits changing the object distance range capable of focusing for wide-macro photography by holding the focusing lens at a predetermined position at this time, permits reliable focusing from immediate lens front to infinity, permits satisfactory photographing in the wide-macro region, eliminates wasteful power consumption by unnecessary operation of the focusing lens driving motor, and can be effectively used particularly for portable video cameras Or integral camera video tape recorders.

To attain the above objects of the invention, as a preferred embodiment of the invention there is provided a lens control system, which comprises focusing lens driving means for driving a focusing lens to effect focusing, zooming lens driving means for driving a zooming lens for zooming operation, focusing lens position detecting means for detecting the position of the focusing lens, zooming lens position detecting means for detecting the position of the zooming lens, and control means for controlling the focusing lens driving means to stop the focusing lens at a predetermined position when the zooming lens position detecting means detects that the zooming lens is in a macro region.

A fourth object of the invention is to provide a lens control system, which permits smooth autofocusing operation in a plurality of different regions.

A fifth object of the invention is to provide a lens control system, which permits improvement of response in focusing operation when switching the focusing operation between wide-macro and normal regions, particularly response in autofocusing operation when switching the wide-macro region over to the normal region, in a camera or the like capable of focusing in the normal and wide-macro regions and also permits reducing drive noise and power consumption during an autofocusing operation in the wide-macro region.

A sixth object of the invention is to provide a lens control system, which permits adequate focusing lens control at the time of initialization for wide-macro autofocusing or at the time of post-processing after wide-macro autofocusing, thus permitting great improvement of response in autofocusing operation at the end of wide-macro autofocusing and reduction of noise and power consumption due to otherwise possible unnecessary driving of the focusing lens during the wide-macro autofocusing operation.

To attain the above objects of the invention, there is provided, as a preferred embodiment of the invention, a lens control system, which comprises first and second focusing means for executing a focusing operation in respective different regions, switching means for switching the first and second focusing means according to the focusing region, and control means for controlling, when the first focusing means is switched over to the second focusing means by the switching means, the stop position of the first focusing means according to the focusing state of the first focusing means i before the switching and setting, when the second focusing means is subsequently switched over to the first focusing means, the stop position as the initial position of the first focusing means in the operation thereof.

As a further preferred embodiment of the invention, there is provided a lens control system, which comprises focusing means capable of a focusing operation in first and second regions different from each other, operating region switching means for switching the operating region of the focusing means between the first and second regions, storing means for storing the operating state of the focusing means in the first region before switching of the operating region of the focusing means from the first region over to the second region by the operating region switching means, and control means for controlling the focusing means according to information stored in the storing means when the second region is switched back to the first region after operation in the second region.

A seventh object of the invention is to provide a lens control system, which can eliminate the problem in a camera or the like capable of a focusing operation in normal, tele-macro and wide-macro regions that it becomes impossible, depending on the focusing lens position, to focus all objects when control proceeds to the wide-macro region and permits reliable focusing at all time of a distant object as well irrespective of the state thereof.

An eighth object of the invention is to provide a lens control system, which permits comfortable wide-macro autofocusing operation at all times without possibility of disability of focusing irrespective of the object distance with adequate focusing lens position control executed at the time of initialization prior to the start of wide-macro autofocusing operation, as well as permitting improvement of response at the time of switching in each autofocusing operation and realization of an autofocusing system of satisfactory operability.

To attain the above objects of the invention, there is provided as a preferred embodiment of the invention, a lens control system, which comprises first and second focusing means for executing a focusing operation in respective different regions, switching means for switching the first and second focusing means according to a focusing region, and control means for detecting, when the first focusing means is switched over to the second focusing means by the switching means, the position of the first focusing means before the switching and forcibly moves the first focusing means to a predetermined position according to the detected position.

All the above and other objects and features of the invention will become more apparent from the following description and drawings.

DETAILED DESCRIPTION OF THE PREFERRED EMBODIMENTS

The lens control system according to the invention will be described in conjunction with one embodiment thereof with reference to the drawings.

Figure 1:
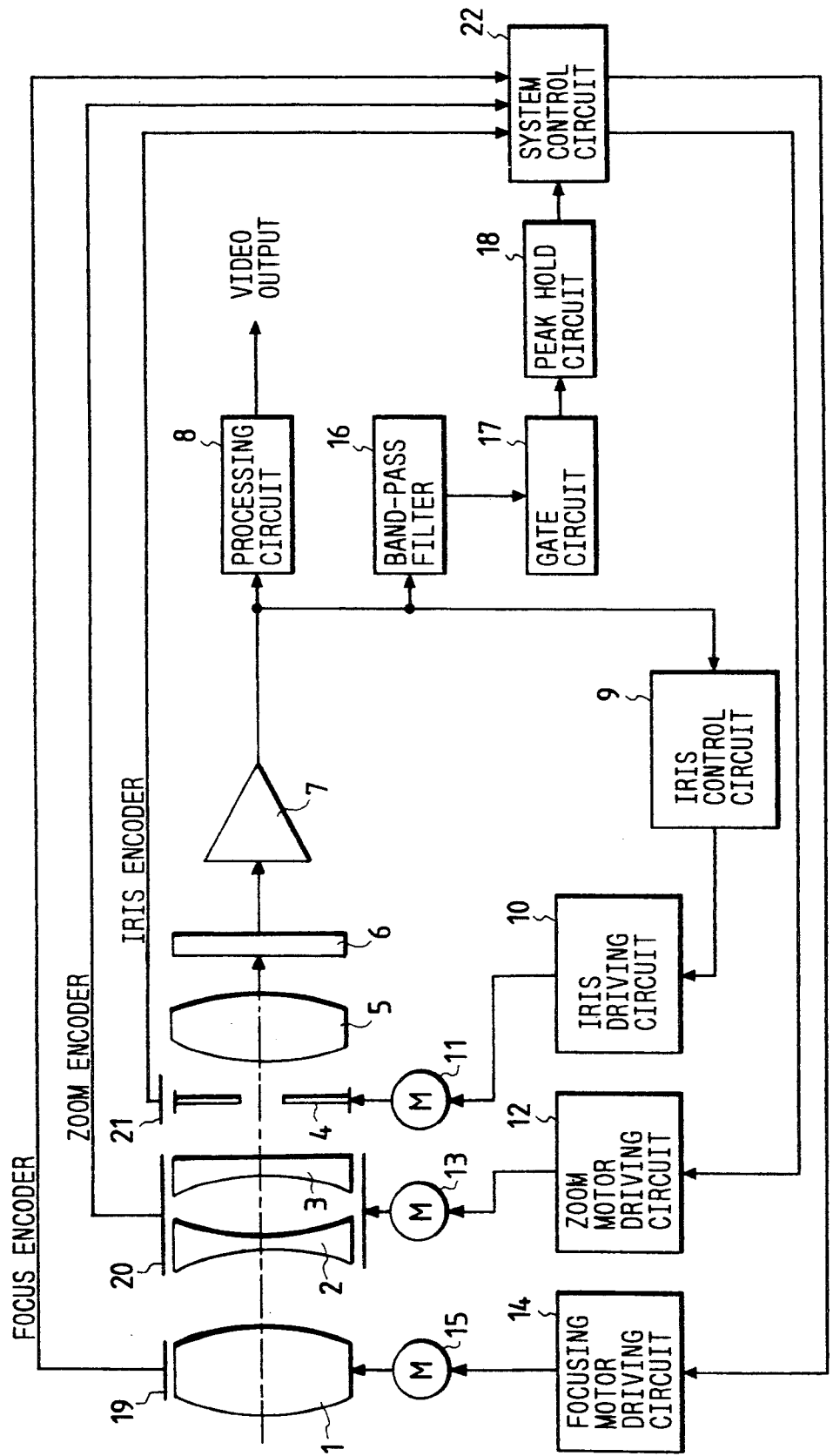
FIG. 1 is a schematic showing of the construction of an embodiment of the lens control system according to the invention.

FIG. 1 is a schematic showing of an embodiment of the lens control system according to the invention applied to a video camera.

Referring to the Figure, designated at 1 is a focusing lens group for focusing, at 2 and 3 are zoom lens groups for zooming, at 4 is an iris for controlling the amount of incident light, and at 5 is a release lens.

Focusing lens 1 is controllably driven through focusing motor driving circuit 14 and focusing motor 15. Zoom lenses 2 and 3 are controllably driven through zoom motor driving circuit and zoom motor 13.

Iris 4 is controllably driven through iris driving circuit 10 and iris driving ig meter 11.

Designated at 6 is an image sensor element, for instance a CCD, for photoelectrically converting an object image, which is focused on an image-sensing surface by focusing lens 1, into an electric image signal, at 7 is a preamplifier for amplifying image signal from image sensor element 6 to a predetermined level, and at 8 is a processing circuit, which subjects the video signal output of preamplifier 7 to predetermined processes such as gamma correction, blanking process and sync signal addition to obtain a standard television signal provided from a video output terminal. The television signal provided from processing circuit 8 is supplied to a video recorder (not shown) or a monitor (not shown) with an electronic view finder.

Designated at 9 is an iris control circuit, which receives the video signal from preamplifier 7 for automatic control of ig meter 11 through iris driving circuit 10 to control the aperture of iris 4 such as to provide a constant video signal level.

Designated at 16 is a band-pass filter for extracting a high frequency component necessary for focus detection from the video signal from preamplifier 7. Designated at 17 is a gate circuit for gating the output of band-pass filter 16 to pass only a signal corresponding to a designated region on image sensor screen. More specifically, gate circuit 17 generates a gate pulse in response to a command of system control circuit 22 to be described later. In response to the gate pulse, only a signal corresponding to a designated region in video signal for one field is passed, whereby a pass region for extracting a high frequency component, i.e., a focus detection region for focus detection, is set at a given position on the image sensor screen.

Designated at 18 is a peak hold circuit for detecting and holding a peak value of a high frequency component in one field of video signal corresponding to the focus detection region extracted by gate circuit 17.

Designated at 19 is a focus encoder for detecting the position of focusing lens 1, at 20 is a zoom encoder for detecting focal distance information variable by zoom lenses 2 and 3, and at 21 an iris encoder for detecting the aperture of iris 4.

Designated at 22 is a system control circuit for controlling the entire system. The circuit is constituted by a microcomputer, for instance, internally including an input/output port, an A/D converter, a read-only memory (ROM) and a random access memory (RAM) (these parts being not shown).

System control circuit 22 fetches and compares the output of peak hold circuit 18 for each field and effects commonly termed mountain climbing control by supplying control signals concerning the direction of rotation, speed of rotation, start/stop of rotation, etc., of focusing motor driving circuit 14 such as to drive focusing lens 1 in a direction to increase the peak value.

The speed of driving of focusing lens 1 at this time is also controlled according to the level of and extent of change in the peak. Actually, it is controlled according to the degree of focusing, that is, it is high at a large blur position greatly apart from the focal point and is reduced as the focal point is approached.

System control circuit 22 further calculates the field depth from zoom lens focal distance information obtained from zoom encoder 20 and iris value information obtained from iris encoder 21 and controls the speed of driving of focusing lens 1 or size of focus detection region formed by gate circuit 17.

Furthermore, system control circuit 22 effects lens control in wide-macro region as a feature of the invention as will be described hereinunder.

When it is detected from the output of zoom encoder 20 that zoom lenses 2 and 3 have entered the wide-macro region, focusing motor 15 is driven through control of focusing motor driving circuit 14 to forcibly bring focusing lens 1 to a predetermined position.

This control operation will now be described with reference to the flow chart of FIG. 2.

Figure 2:
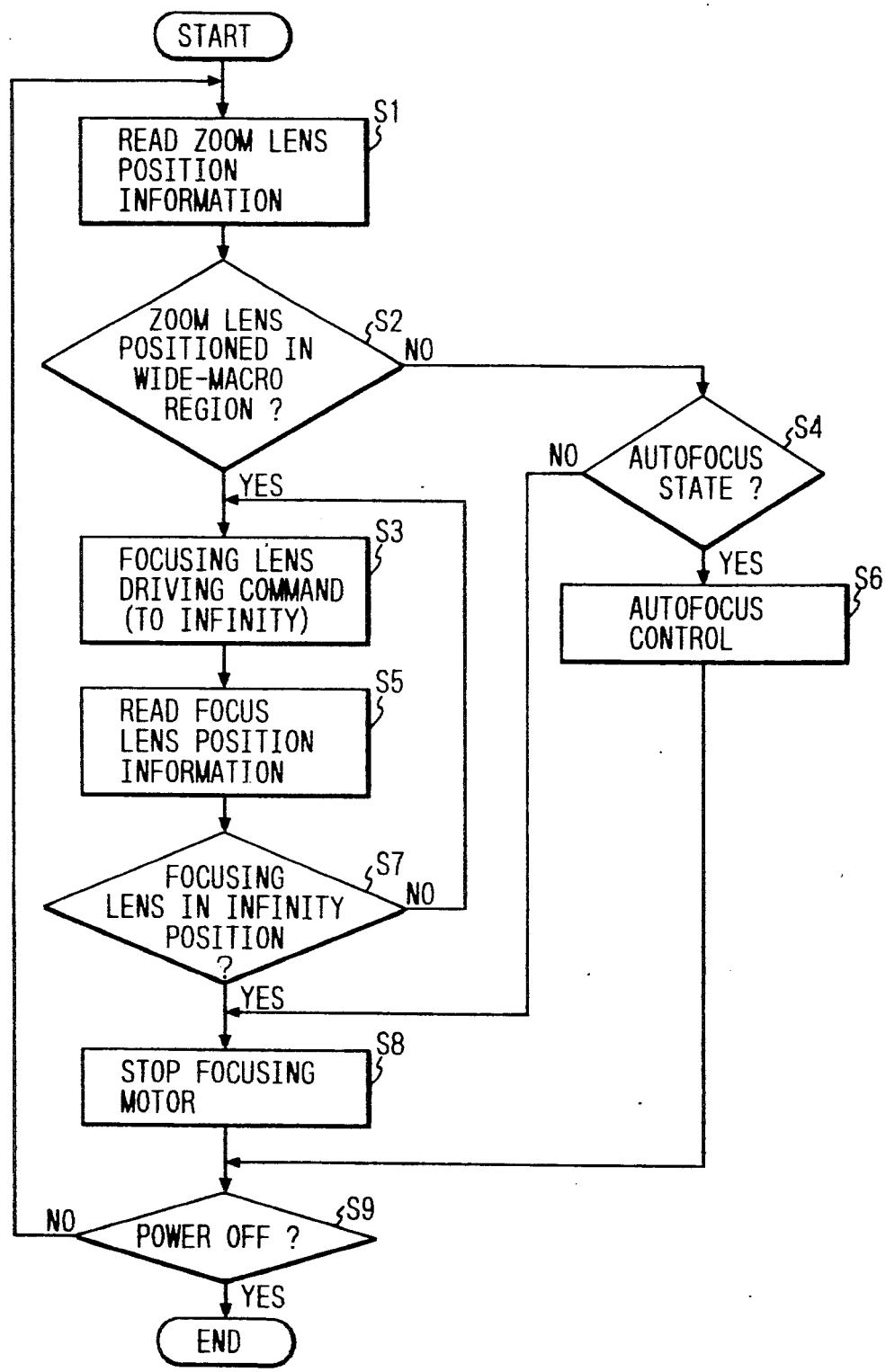
FIG. 2 is a flow chart for explaining a control operation of the lens control system according to the invention.

Referring to FIG. 2, when the control is started, step S1 is executed, in which the position of zoom lenses 2 and 3, i.e., focal distance, is detected from the output of zoom encoder 20, and in step S2 a check is executed as to whether the zoom lenses are in a normal region or in a wide-macro region.

If the zoom lens position is not in the wide-macro region but in the normal region, a check is executed in step S4 as to whether autofocusing is in force. If the autofocusing is in force, the routine goes to step S6 of photofocus control, i.e., mountain climbing control of the focusing lens according to changes in the high frequency component peak in each field.

After this photofocus control, a check is executed in step S9 as to whether power is "off". If power is "off", the control is ended. If power is not "off", the routine goes back to step S1, and is repeated.

If it is detected in step S4 that the system is not in the autofocus state but in the manual focus state, focusing motor 15 is unnecessary, and therefore it is stopped in step S8. Then, the control is ended if it is found in subsequent step S9 that power is "off". If power is not "off", the routine goes back to step S1 to repeat the operation described above.

If it is detected in step S2 that zoom lenses 2 and 3 are not in the wide-macro region, the routine goes to step S3, in which focusing motor driving circuit 14 is controlled to drive focusing motor 15 such as to bring focusing lens 1 to a predetermined position, i.e., infinite position in this embodiment.

At the same time, in step S5, focus encoder 19 detects the position of focusing lens 1, and in step S7 a check is executed as to whether focusing lens 1 is at the predetermined position, i.e., infinite position. If the lens is not at infinite position, the routine goes back to step S3 to continue control to bring focusing lens 1 to infinite position by driving focusing motor 15.

If it is detected in step S7 that focusing lens 1 is at the infinite position, the routine goes to step S8 to stop focusing motor 15, and in subsequent step S9 a check is executed as to whether power is "off". If power is "off", it brings an end to control.

If power is not "off", the routine goes back to S1 and is repeated.

In the above operation, the focusing lens is forcibly moved to the infinite position when the zoom lens enters the wide-macro region. Thus, in the wide-macro region, the focusing lens is held at a fixed position at all times. Thus, a fixed focal distance range can be secured at all time in the wide-macro region.

Further, since the focusing lens stop position is set to the infinite position, reliable focusing can be obtained from the immediate lens front position to the infinite position to permit satisfactory photographing in the wide-macro region without variation of image magnification or deviation from focus.

In the prior art system the focusing lens is fixed in its position when it enters the wide-macro region. Therefore, it is impossible to make photofocus control from the immediate lens front position to the infinite position depending on the focusing lens position, and considering greater field depth on the wide-end side it is impossible to obtain highly accurate photofocus control. With the construction according to the invention reliable photofocus control can be obtained over the entire region.

Further, since the focusing lens is fixed in position in the wide-macro region, there is no possibility of focusing lens position variations or blur or magnification changes at the time of wide-macro photography.

Further, when focusing is done manually, the focusing motor is reliably stopped to eliminate wasteful power consumption.

Further, in this embodiment the focusing lens is forcibly moved to the infinite position to provide the greatest photofocus control range when the wide-macro region is brought into force. However, in view of greater field depth it need not be brought to the infinite position but may be brought to a position on the macro side of infinity so long as the focusing accuracy is not substantially deteriorated and sufficient accuracy can be ensured.

Doing so permits reduction of time required for the movement of the focusing lens.

As has been shown, with the lens control system according to the invention at the time of wide-macro photography the object distance capable of focusing at this time can be varied by forcibly stopping the focusing lens at a predetermined position. By so doing, it is possible to prevent changes in image magnification, permit reliable focusing from the immediate lens front position to infinite position and obtain satisfactory photography in the wide-macro region.

Further, there is no possibility of wastefully consuming power by unnecessarily operating the focusing motor. The system thus is useful particularly for portable video cameras or integral camera video recorders.

Now, a second embodiment of the invention will be described. In this embodiment, when the autofocusing operation in the wide-macro region is set in, right before the setting of wide-macro AF mode the focusing motor is stopped at focusing position if the focusing lens is in the state of focus and, if the focusing lens is out of state of focus, the motor is driven in the moving direction for a predetermined period of time before being stopped, thus improving the stability and response when the normal AF mode is restored.

Figure 3:
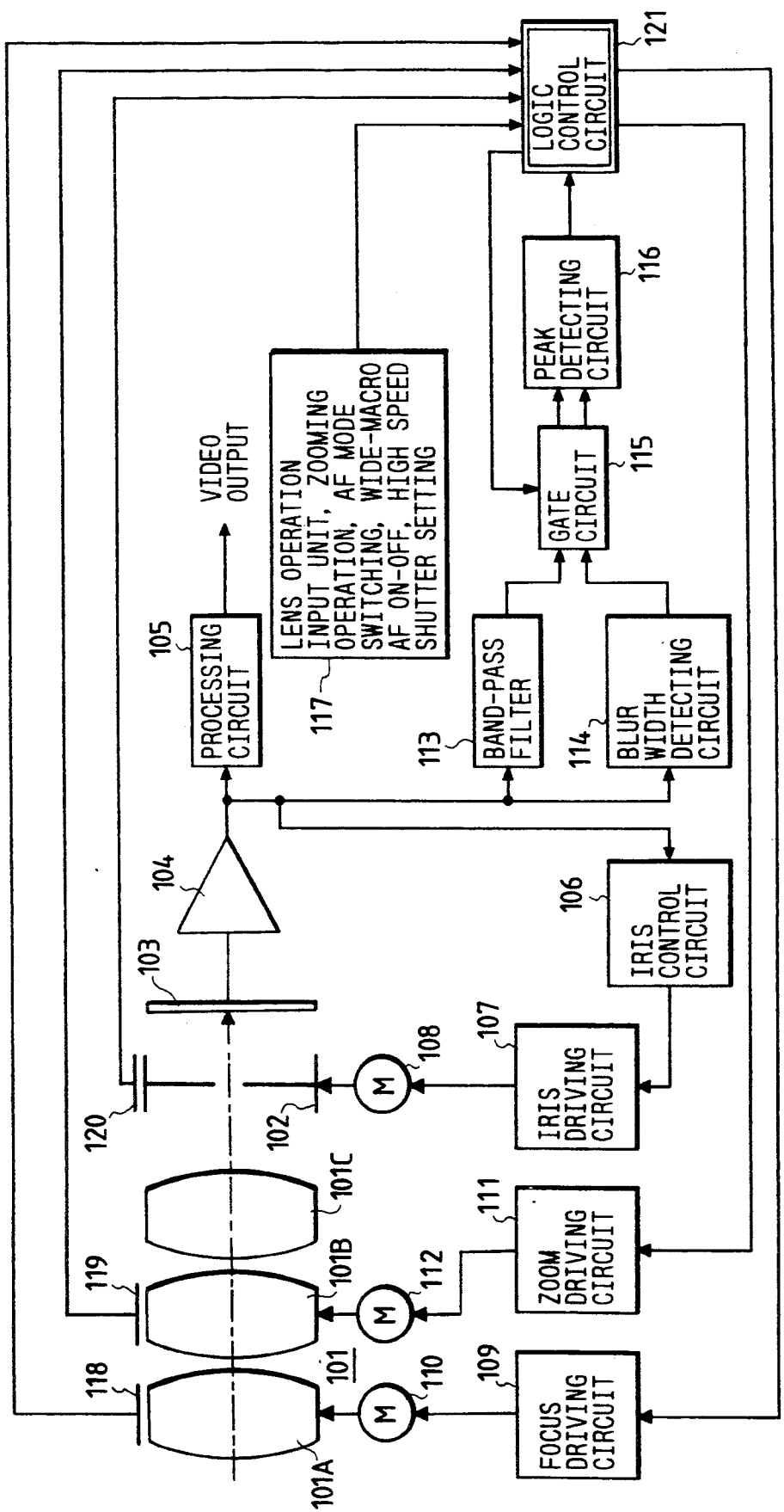
FIG. 3 is a schematic showing of a second embodiment of the invention applied to a video camera.

FIG. 3 is a schematic showing the lens control system according to the invention applied to a video camera.

Referring to the Figure, designated at 101 is a photographing lens system including focusing lens group 101A having a front lens for photofocus control or focusing, zoom lens group 101B for effecting focusing in the wide-macro region and lens group 101C of a correction system (these lens groups being hereinafter referred to as focusing lens, zoom lens and correction lens, respectively).

Focusing lens 101A has a commonly termed tele-macro region (of 0.6 to 1.2 mm) which is an extension of the driving range to the macro side. In this tele-macro region, the autofocusing operation is possible as in the normal region.

Focusing lens 101A is controllably driven through focusing motor driving circuit 109 and focusing motor 110. Zoom lens 101B is controllably driven through zoom motor driving circuit 111 and zoom motor 112. Designated at 102 is an iris for controlling the amount of incident light. Iris 102 is controllably driven through iris driving circuit 107 and ig meter 108 for iris driving. Designated at 103 is an image sensor element, for instance a CCD, for photoelectrically converting an object image focused on an image-sensing surface into an electric image signal, at 104 a preamplifier for amplifying the image signal output of image sensor element 103 to a predetermined level, and at 105 a processing circuit, which subjects video signal from preamplifier to predetermined processes such as gamma correction, blanking process and sync signal addition to obtain a standard television signal which is provided from a video output terminal. The television signal output from processing circuit 105 is supplied to a video recorder (not shown) or an electronic viewfinder (not shown).

Designated at 106 is an iris control circuit, which receives a video signal from preamplifier 104 and effects automatic control of ig meter 108 through iris driving circuit 107 to control the aperture of iris 102 such as to provide a constant video signal level.

Designated at 113 is a band-pass filter (BPF) for extracting a high frequency component necessary for focus detection from the video signal output from preamplifier 104. Designated at 114 is a blur width detecting circuit for detecting the blur width of object image (i.e., width of an edge portion of the object image) from video signal. The principle that the blur width of object is reduced as the focus state is approached is utilized for focus detection. A method of focus detection by the blur width detecting circuit is well known and disclosed in, for instance, Japanese Patent Laid-Open Application No. 62-193616, so it is not described in detail.

Designated at 115 is a gate circuit for gating the output of blur width detecting circuit 114 and passing only a signal corresponding to a designated region on image sensor screen. Actually, band-pass filter 113 passes only a signal corresponding to a designated region in video signal for one field under control of a gate pulse supplied from logic control circuit 121 which is described later, whereby a pass region for extracting a high frequency component, i.e., focus detection region for effecting focus detection, can be set at a given position on the image sensor screen. Designated at 116 is a peak detecting circuit for detecting horizontal and vertical positions on image sensor screen of a peak a of high frequency component in the video signal corresponding to the focus detection region extracted by gate circuit 115. Peak detecting circuit 116 actually detects one of a plurality of blocks, into which the focus detection region is divided in horizontal and vertical directions, as the position of a peak detected in one field and provides horizontal and vertical co-ordinates of the detected block.

Designated at 117 is a lens operation input unit for reading various control operations concerning a lens such as zooming operation, AF mode switching, wide-macro AF on-off and high speed shutter setting.

Designated at 118 is a focus encoder for detecting the position of focusing lens 101A, at 119 is a zoom encoder for detecting focal distance information variable by zoom lens 101B, and at 120 is an iris encoder for detecting the aperture of iris 102. The detected information is supplied to logic control circuit 121.

Logic control circuit 121 controls the entire system. It is constituted by a microcomputer, for instance, and it internally includes an input/output port, an A/D converter, a read-only memory (ROM) and a random access memory (RAM) (these parts being not shown). It fetches the peak in one field high frequency component based on output through band-pass filter 113 and peak detecting circuit 116 as well as peak position co-ordinates, blur width information from blur width detecting circuit 114 and detected information from the individual encoders and performs a calculation on these data following a predetermined algorithm. From these time-sequential changes it effects pursuit of the object, i.e., setting of the position, size, direction of movement and speed of movement response of the focus detection region on the image sensor screen. Further, it calculates the direction and speed of movement of the focusing lens.

More specifically, the logic control circuit detects the movement of the object for each field according to the peak in one field high frequency component output of band-pass filter 113 and co-ordinates of the peak position and on-off controls gate circuit 115 by supplying gate pulses thereto to set a focus detection region at a position centered on the varied peak position or object position, thus passing only a video signal portion corresponding to the focus detection region.

Further, logic control circuit 121 effects photofocus control or focusing by effecting focus detection with respect to the object according to the video signal corresponding to the focus detection region noted above. More specifically, it fetches blur width information supplied from blur width direction circuit 114 and high frequency peak information supplied from band-pass filter 113 and controls focus driving circuit 108 by supplying control signals concerning the direction of rotation, speed of rotation, start/stop of rotation, etc. of focusing motor 110 to the circuit according to changes in the time-sequential information, thus driving front focusing lens 101A until the blur width and high frequency component peak in one field respectively become minimum and maximum. Further, in wide-macro AF mode in the wide-macro region, zoom lens 101B is driven for focusing according to blur width and high frequency component peak information corresponding to the degree of focusing.

In this operation, logic control circuit 121 controls the size, range of movement and movement response speed of the focus detection region.

In this way, focusing is executed continuously while pursuing the moving object.

According to the invention, both the blur width signal from blur width detecting circuit 114 and peak of the high frequency component output of band-pass pass filter 113 are used for focus detection for the following reason.

The blur width becomes small as the focal point is approached and is minimum at the focal point, and it is not readily affected by the contrast of the object. Therefore, the blur width information permits high focus detection accuracy to be obtained. On the demerit side, however, the corresponding dynamic range is narrow, and sufficient detection accuracy can not be obtained if there is great deviation from the focal point.

The high frequency component, on the other hand, has a wide dynamic range and permits an output corresponding to the degree of focusing to be obtained even if there is great deviation from the focal point. On the demerit side, however, the obtainable accuracy of focusing is not so high as with blur width information.

Accordingly, both blur width and high frequency component are used in combination to realize a focus detection system, which covers a wide dynamic range and permits high detection accuracy to be obtained in the neighborhood of the focal point.

An autofocusing operation, which is a gist of the lens control system according to the invention, will be described sequentially with reference to the flow chart of FIG. 4.

Figure 4:
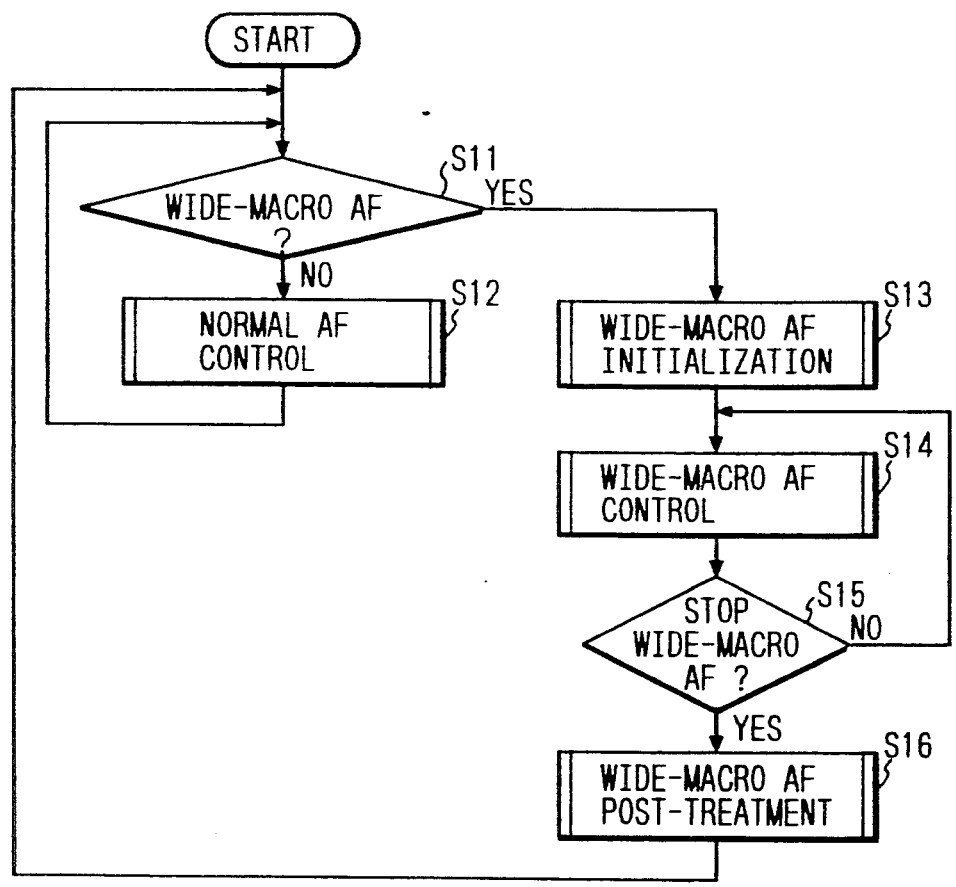
FIG. 4 is a flow chart for explaining a control operation of the lens control system of the second embodiment.

Referring to FIG. 4, when the lens control by logic control circuit 121 is started, step S1 is executed, which is a check as to whether an AF mode in wide-micro photography (hereinafter referred to as wide-micro AF mode) is Set. This check is done by lens operation input unit through a check as to whether there is a wide-micro AF start signal. Step S11 is a routine for detecting the wide-micro AF signal along various lens operation inputs. If it is detected in step S11 that there is no wide-micro AF start signal, thus indicating photography in the normal region, the routine goes to step S12 for normal AF control executed by driving the front focusing lens (hereinafter the control being referred to as normal AF mode).

For setting the wide-macro AF mode, an operating unit (not shown) is operated to automatically move the zoom lens to a wide-macro region.

If it is found in step S11 that the wide-macro AF mode is set and the wide-macro AF start signal is provided, the routine goes to step S13. Thus, the wide-macro AF mode is in force, which is a control mode for focusing by zoom lens operation, and initialization in the wide-macro AF mode is effected. This initialization is an essential part of the invention, and it will be described later in detail.

After the initialization in step S13 is ended, the routine goes to step S14 of wide-macro AF control. This control permits actual focusing operation without use of focusing lens but by driving the zoom lens.

In subsequent step S15, lens operation input unit 117 executes a check as to whether the wide-macro AF operation is to be stopped through a check as to whether there is a wide-macro AF operation stop command. If the wide-macro AF operation stop command is detected, the routine goes to step S16 of wide-macro AF post-treatment. Otherwise, the routine goes to step S14 of wide-macro AF control to continue wide-macro AF operation.

In step S16 of wide-macro AF post-treatment, the zoom lens is forcibly brought out from the wide-macro region to the normal region, and the control routine is returned to step S11 of wide-macro AF start signal detection to be ready for the next wide-macro AF operation.

The control operation of wide-macro AF mode initialization as a gist of the invention, in the flow chart of FIG. 4, will be described in detail with reference to the flow chart of FIG. 5.

Figure 5:
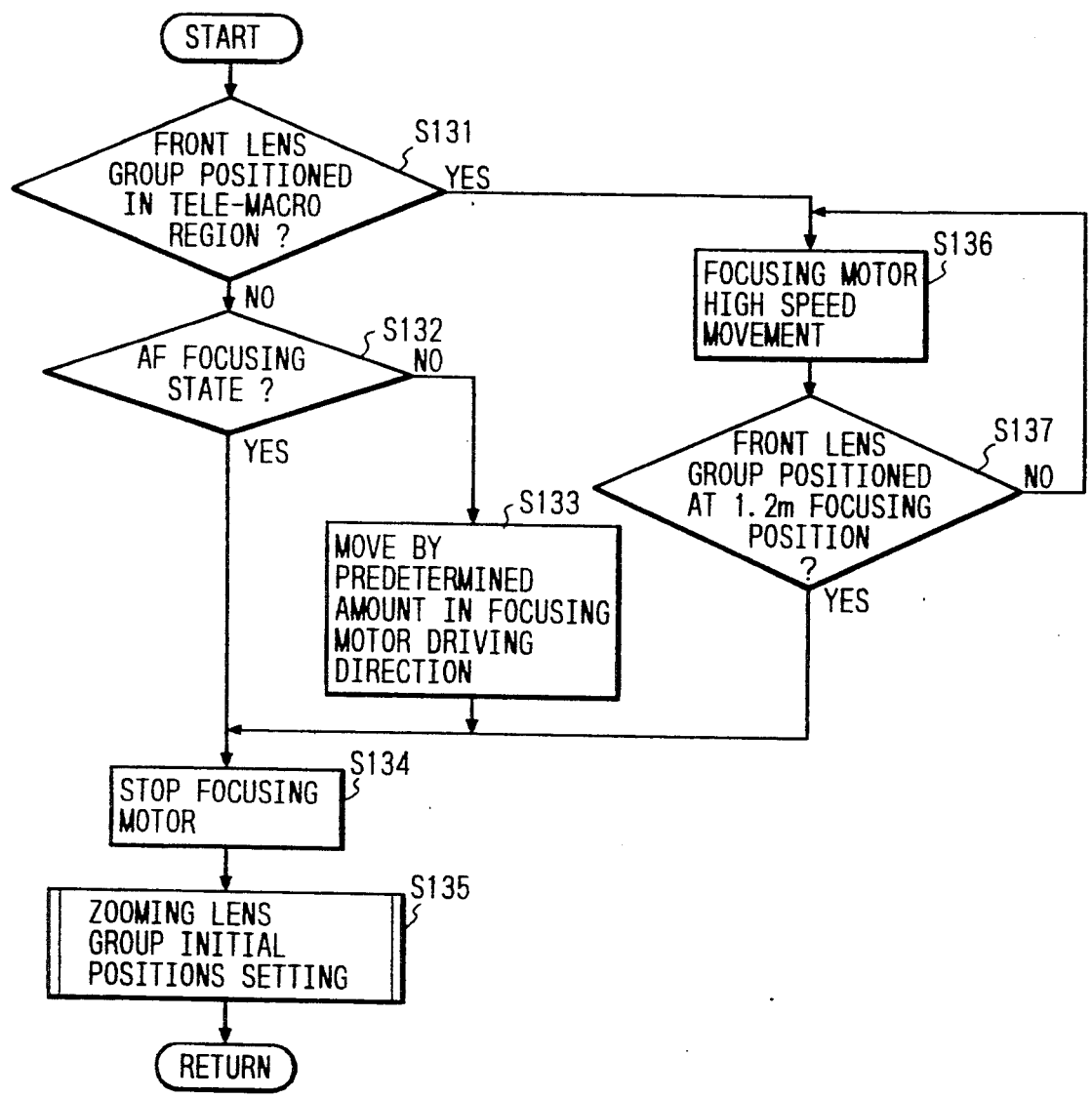
FIG. 5 is a flow chart for explaining an initializing operation at the start of wide-macro autofocusing in the flow chart of FIG. 4.

When step S13 of wide-macro AF initialization shown in FIG. 4 is brought about with detection of the wide-macro AF mode in step S11 by a wide-macro AF start signal, the position of the front focusing lens is immediately detected by focus encoder 118 in step S131 in FIG. 5. If it is determined that the front focusing lens is in a commonly termed tele-macro region of 0.6 to 1.2 mm (hereinafter referred to as tele-macro region), the routine goes to step S136 of front focusing lens movement. If it is determined that the focusing lens is not in the tele-macro region of 0.6 to 1.2 but in the normal region of 1.2 m to infinity, the routine goes to step S132 of focus defection.

When the routine goes to step S132 without detection of the front focusing lens in the tele-macro region in step S131, a check is executed at the start of wide-macro AF operation as to whether there is a focusing state in normal AF operation. If the focusing state is detected, the routine goes to step S134 to stop the focusing motor, thus stopping front focusing lens 1A.

If the normal AF focusing state is not detected at the start of wide-macro AF operation in step S132, the routine goes to step S133 to move the focusing lens for a predetermined period of time or a predetermined distance in the direction in which the focusing lens is being moved. Then in step S134 the focusing lens is stopped.

If it is detected in step S131 that the focusing lens is in the tele-macro region, the routine goes to step S136 to move the focusing lens at the highest speed toward infinity until reaching of macro-end position of 1.2 m in the normal region. In subsequent step S137 a check is executed as to whether the focusing lens is at a 1.2 m focusing position. If this step yields Yes, the routine goes to step S134 to stop the focusing motor and hence stop the focusing lens.

After the focusing lens is stopped to bring an end to the focusing lens initializing operation at the time of the start of wide-macro AF operation noted above, the routine goes to step S135 to set the zoom lens at an initial position in the wide-macro region, thus bringing an end to the wide-macro AF initialization operation and returning the routine to step S14 in the flow chart of FIG. 4.

As is shown, different operations are performed depending on whether the front focusing lens is in the tele-macro region at the time of start of the wide-macro AF operation. The reason for this will now be described.

If the front focusing lens is in the tele-macro region at the time of start of the wide-macro AF operation, the object is not focused in the ordinary wide-macro region, and thus the focusing lens is driven at the highest speed to the 1.2-m focusing position in the normal region. This is done so in order to prevent perfect disability of focusing a distant object in focusing operation in the wide-macro region with the focusing lens in the tele-macro region.

More specifically, in an AF system, in which AF in the commonly termed tele-macro region, in which the object distance capable of focusing with the front focusing lens is from 0.6 m to infinity, and wide-macro AF, there is a possibility of perfect disability of focusing depending on photographing conditions even in a photographing state which intrinsically permits focusing. Therefore, in case when the front focusing lens is in the tele-macro region for tele-macro AF, the phenomenon of perfect disability of focusing on a distant object takes place.

For this reason, according to the invention the front focusing lens is forcibly retreated to the normal region prior to the start of wide-macro AF. Consequently, an image which is not uncomfortable to see can be obtained even if a distant object is photographed by wide-macro AF without considering the position of the front focusing lens.

On the other hand, if the focusing lens is not in the tele-macro region at the time of start of wide-macro AF, the control is varied depending on the state of AF. More specifically, if the object is in focus, it is highly possibly in the neighborhood of that state even when wide-macro AF is ended. Otherwise, the object is highly possibly found in a direction of driving of the focusing lens at the start of wide-macro AF.

Accordingly, the state of the object is judged by detecting the focusing state in step S132, and if the focusing state is detected, the focusing motor is instantly stopped, while otherwise, i.e., during focusing operation, the focusing lens is driven to a predetermined extent in the presently moving direction before stopping the focusing motor. Doing so has an effect of reducing the probability of losing the object at the start of the normal AF operation subsequent to the end of wide-macro AF operation and thus improves the initial response.

Further, during wide-macro AF operation the position of the front focusing lens is independent of focusing, and therefore, during this time it is held stationary to reduce noise and power consumption by AF driving during the wide-macro photographing operation.

As has been shown, according to the invention the focusing motor is controlled adequately according to the focusing state at the time of start of wide-macro AF operation, thus permitting prevention of noise and power consumption that might otherwise result from the focusing lens driving during wide-macro AF operation and improving the initial response characteristics of the normal AF operation.

In the above embodiment the focusing lens is stopped or moved to a predetermined extent in a predetermined direction before being stopped depending on the focusing state at the time of start of wide-macro AF. However, this sequence is by no means limitative, and it is possible to execute this control during wide-macro AF operation.

Further, while in the above embodiment the focusing lens is moved to a predetermined extent in a predetermined direction before being stopped if it is determined that no focusing state exists at the start of & wide-macro AF, this is by no means limitative; for instance, it is possible to store the direction of driving of the focusing motor if a focusing operation is in force at the time of start of wide-macro AF and re-start the focusing motor at a predetermined speed in the stored direction.

If the focusing state is detected in such sequence, normal focusing is caused with the focusing motor not driven but held stationary after wide-macro AF operation.

Figure 6:
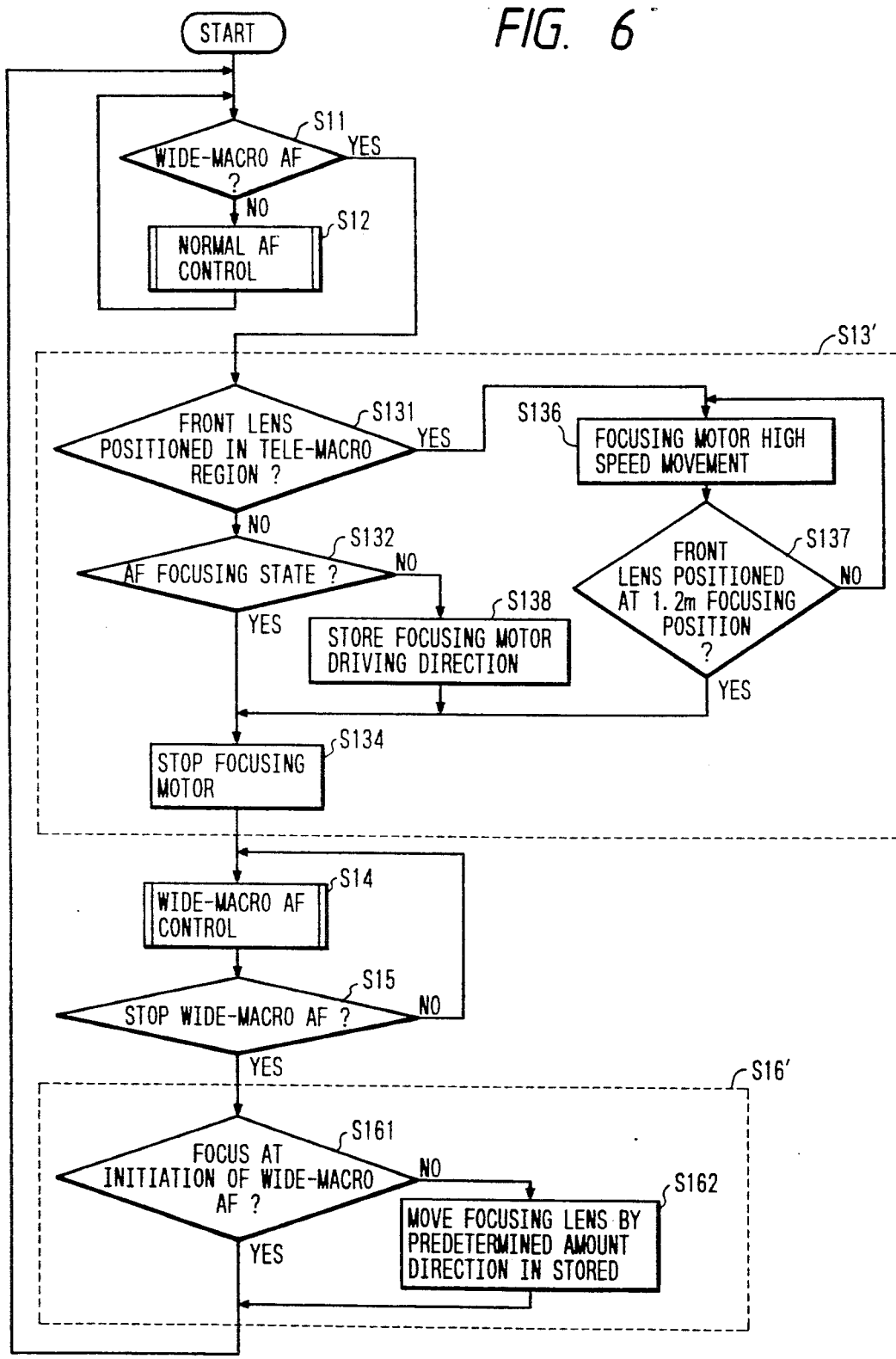
FIG. 6 is a flow chart for explaining a control operation of a third embodiment of the lens control system according to the invention.

FIG. 6 is a flow chart for explaining a control routine for switching between normal and wide-macro AF operations in a third embodiment of the invention.

More specifically, this routine is obtained by altering step S13 of wide-macro AF initialization and step S14 of wide-macro post-treatment shown in FIG. 4. In the Figure, steps like those in the flow charts of FIGS. 4 and 5 are designated by like reference symbols, and their description is not repeated.

Referring to the Figure, if wide-macro AF operation is declared and started in step S11, the routine goes to step S13' of wide-macro AF initialization.

When the wide-macro AF initialization step sets in, the region in which the front focusing lens is positioned is determined in step S131, and in subsequent step S132 the focusing state immediately before the wide-macro AF operation is checked.

If the front focusing lens is not in the tele-macro region at the start of wide-macro AF and it is detected in step S132 that there was a focusing state immediately before the wide-macro AF operation, the focusing motor is stopped at that position in step S134. If no focusing state is detected, the routine goes to step S138 to store focusing direction, i.e., direction of driving of the focusing lens, and then in step S134 the focusing lens is stopped.

Subsequently, side-macro AF operation is executed in step S14, and upon detection of the end of wide-macro AF operation in step S15 the routine goes to step S16 of wide-macro AF post-treatment.

In the wide-macro AF post-treatment, a check is done in step S161 as to whether there was a focusing state at the time of start of wide-macro AF. If there was focusing state at the time of start of wide-macro AF and it is found in step S138 that no focusing lens driving direction is stored, the focusing lens is not moved. If no focusing state is detected at the time of start of wide-macro AF and it is found in step S138 that a focusing lens driving direction is stored, the routine goes to step S162 to move the focusing lens to a predetermined extent in the stored direction before stopping the lens. This position is set as initial position in the next AF operation.

Subsequently, the routine goes to step S11. If no other wide-macro AF operation command is provided, the routine goes to step S12 of normal AF with the position set in previous step S161 or S162 as initial position of the focusing lens.

The extent of driving of the focusing lens in step S162 may be determined by forecasting a position approximating the focal point from the speed of the focusing lens immediately before the start of wide-macro AF. Alternatively, the focusing lens may be driven and stopped at a position of high probability of focusing from considerations of object conditions of high frequency of normal photographing.

With this arrangement, the same effects as with the previous first embodiment can be obtained.

As has been shown, with the lens control system according to the invention the AF operation response at the time of end of wide-macro AF can be greatly improved through adequate control of the focusing lens at the time of wide-macro AF initialization or wide-macro AF post-treatment. In addition, it is possible to reduce noise and power consumption due to otherwise executed unnecessary driving of the focusing lens during wide-macro AF operation.

As has been shown, in a video camera, in which AF is performed in a wide-macro region by driving the zoom lens and performed in tele-macro region by bringing the focusing lens to an extended wide-macro region, the focusing lens, if it is in the tele-macro region when AF in the wide-macro region sets in, may be forcibly moved to infinity in the normal or tele-macro region to improve the response at the time of end of the wide-macro AF mode.

In addition, in the above embodiment the focusing lens, if it is found to be in the tele-macro region at the time of start of the wide-macro AF operation, is moved to an object distance 1.2 m focusing position. However, the movement to this position is by no means limitative. For example, step S137 in the flow chart of FIG. 5 may be changed to step S137' shown in FIG. 7. In this case, if the focusing lens is in tele-macro region at the time of start of wide-macro AF operation, it is moved at high speed to the center of the normal region of 0.6 to 1.2 m.

Figure 8:
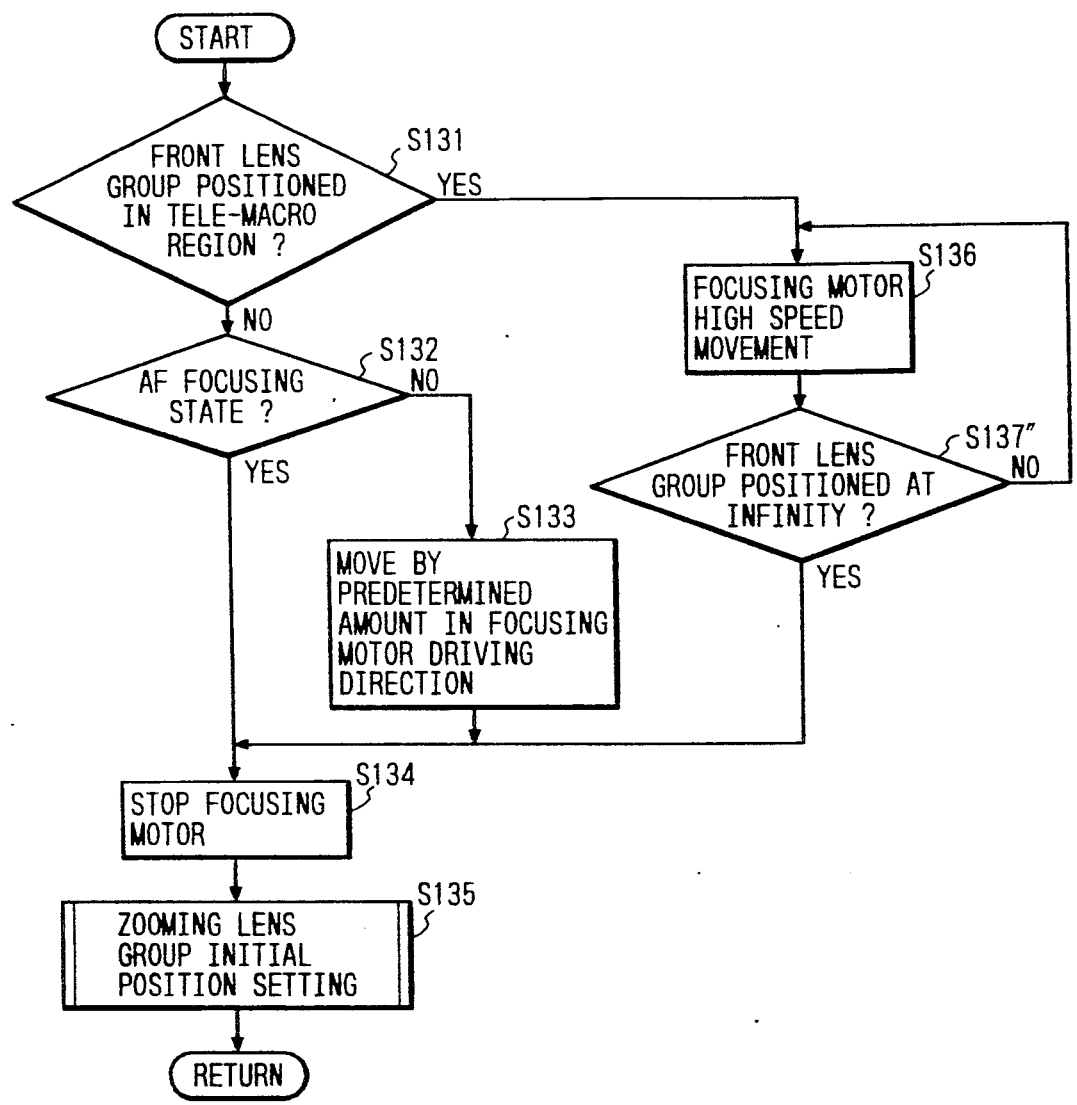
FIG. 8 is a flow chart for explaining a control operation of a fifth embodiment of the lens control system according to the invention.

Further, step S137 in FIG. 5 may be changed to step S137" in FIG. 8. In this case, if the focusing lens is in tele-macro region at the time of start of wide-macro AF operation, it is moved at high speed to infinity.

Further, the above embodiment employed focus encoder 118 for focusing lens position detection to move the focusing lens to a desired position. However, this method is by no means limitative. For example, step S137 in the flow chart of FIG. 5 may be changed to step S137''' in FIG. 9. In this case, if the focusing lens is found to be in tele-macro region at the time of start of wide-macro AF, the focusing lens is moved to be in the normal region by driving the focusing motor at high speed and only for a predetermined period of time toward infinity.

Figure 7:
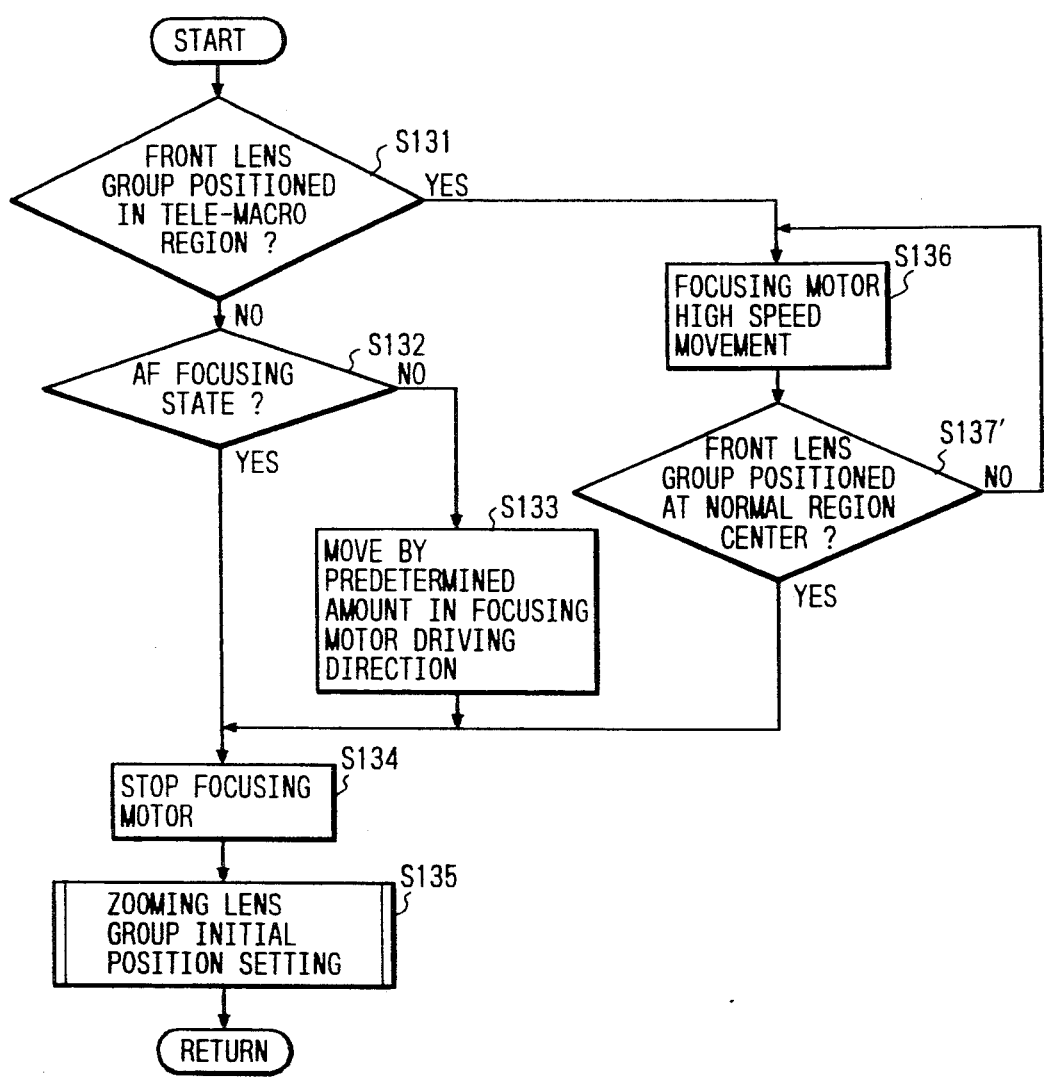
FIG. 7 is a flow chart for explaining a control operation of a fourth embodiment of the lens control system according to the invention.
Figure 9:
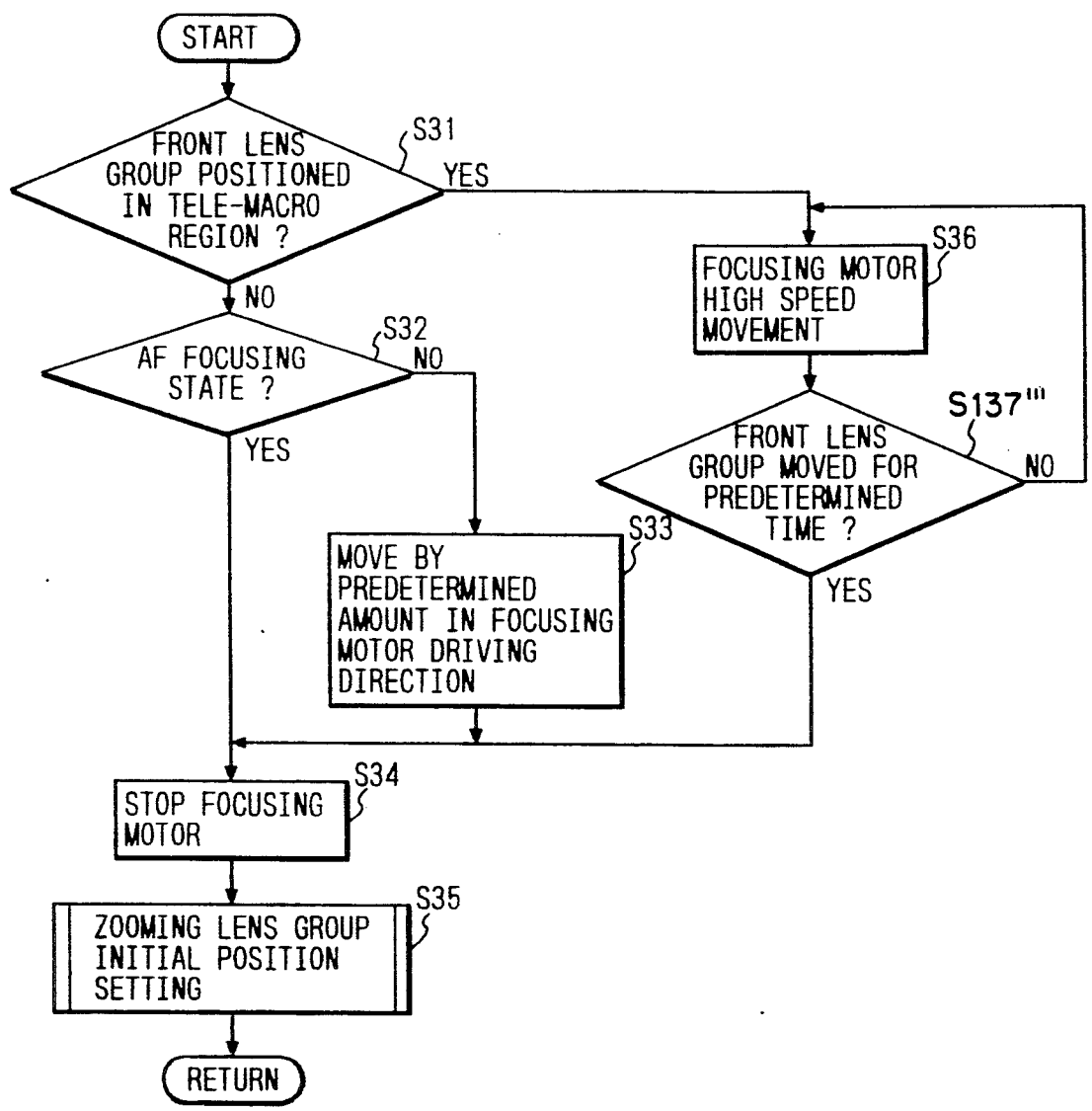
FIG. 9 is a flow chart for explaining a control operation in a sixth embodiment of the lens contol system according to the invention.

The flow charts of FIGS. 7 to 9 are the same as the flow chart of FIG. 5 except for steps S137', S137" and S137''', SO description of these steps is given above.

As has been described in the foregoing, with the lens control system according to the invention adequate control of the focusing lens position at the time of initialization executed prior to the start of wide-macro AF operation permits comfortable wide-macro AF operation to be realized at all times without possibility of disability of focusing.

In addition, it is possible to realize an AF system, which has improved response at the time of AF operation switching and can feature satisfactory operability.

What is claimed is:

1. A lens control system comprising: focusing lens driving means for driving a focusing lens to effect focusing; zooming lens driving means for driving a zooming lens for zooming operation; focusing lens position detecting means for detecting the position of said focusing lens; zooming lens position detecting means for detecting the position of said zooming lens; and control means for controlling said focusing lens driving means to stop said focusing lens at a predetermined position when said zooming lens position detecting means detects that said zooming lens is in a macro region.

2. The lens control system according to claim 1, wherein said predetermined position is an infinite position.

3. A lens control system comprising: first and second focusing means for executing focusing operation in respective different regions;
   switching means for switching said first and second focusing means according to focusing region; and
   control means for controlling, when said first focusing means is switched over to said second focusing means by said switching means, the stop position of said first focusing means according to the focusing state of said first focusing means before the switching and setting, when said second focusing means is subsequently switched over to said first focusing means, said stop position as initial position of said first focusing means in the operation thereof.

4. The lens control system according to claim 3, wherein said first focusing means executes focusing in a normal region, while said second focusing means executes focusing in a wide-macro region.

5. The lens control system according to claim 3, wherein said control means stops said first focusing means at a position of focusing state if the first focusing means is in the focusing state when said first focusing means is switched over to said second focusing means and, if said first focusing means is not in the focusing state, stops said first focusing means at a position reached after driving of said first focusing means by a predetermined amount in a driving direction.

6. A lens control system comprising:
   focusing means capable of focusing operation in first and second regions different from each other;
   operating region switching means for switching the operating region of said focusing means between said first and second regions;
   storing means for storing the operating state of said focusing means in said first region right before switching of the operating region of said focusing means from said first region over to said second region by said operating region switching means; and
   control means for controlling said focusing means according to information stored in said storing means when said second region is switched back to said first region after focusing operation in said second region.

7. The lens control system according to claim 6, wherein said storing means stores the direction of movement immediately before the switching of the operating region of said focusing means, and said control means sets, when the operating region of said focusing means is switched to said first region after focusing operation in said second region, a position reached after driving of said focusing means by a predetermined amount in a direction stored in said storing means.

8. A lens control system comprising:
   first and second focusing means for executing focusing operation in respective different regions;
   switching means for switching said first and second focusing means according to focusing region; and
   control means for detecting, when said first focusing means is switched over to said second focusing means by said switching means, the position of said first focusing means before the switching and forcibly moves said first focusing means to a predetermined position according to the detected position.

9. The lens control system according to claim 8, wherein said first focusing means executes focusing in a normal region, while said second focusing means executes focusing in a wide-macro region.

10. The lens control system according to claim 9, wherein said first focusing means is capable of focusing operation in a normal region and a tele-macro region, and said control means drives, if the position of said first focusing means immediately before switching of said first focusing means over to said second focusing means by said switching means is in said tele-macro region, said first focusing means to said predetermined position in said normal region.

11. The lens control system according to claim 8, wherein said control means moves said first focusing means at a highest speed to said predetermined position.

* * * * *